US012438717B2

(12) United States Patent
Sajjad et al.

(10) Patent No.: US 12,438,717 B2
(45) Date of Patent: Oct. 7, 2025

(54) SELECTIVE DATA SHARING

(71) Applicant: BRITISH TELECOMMUNICATIONS PUBLIC LIMITED COMPANY, London (GB)

(72) Inventors: Ali Sajjad, London (GB); Mamun Abu-Tair, London (GB); Syed Muhammad Unsub Zia, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 107 days.

(21) Appl. No.: 18/577,182

(22) PCT Filed: Jun. 16, 2022

(86) PCT No.: PCT/EP2022/066496
§ 371 (c)(1),
(2) Date: Jan. 5, 2024

(87) PCT Pub. No.: WO2023/280546
PCT Pub. Date: Jan. 12, 2023

(65) Prior Publication Data
US 2024/0235832 A1    Jul. 11, 2024

(30) Foreign Application Priority Data

Jul. 9, 2021 (GB) .................................. 2109926

(51) Int. Cl.
*H04L 9/14* (2006.01)
(52) U.S. Cl.
CPC ...................... *H04L 9/14* (2013.01)
(58) Field of Classification Search
CPC ... H04L 9/14; H04L 2209/805; H04L 9/0822; H04L 9/3247; H04L 9/50; H04L 63/0471;
(Continued)

(56) References Cited

U.S. PATENT DOCUMENTS 9,087,205 B2   7/2015  Kremp et al.
9,735,962 B1 * 8/2017  Yang .................. H04L 9/0877
(Continued)

FOREIGN PATENT DOCUMENTS

EP    3386162 A1 * 10/2018 ............ H04W 12/08
JP    2012080318 A  *  4/2012 ........... H04L 63/061
WO   2019072823 A1    4/2019

OTHER PUBLICATIONS

AWS KMS concepts, Amazon Web Services, Inc., 2023, 36 pages.
(Continued)

*Primary Examiner* — John B King
(74) *Attorney, Agent, or Firm* — Nixon & Vanderhye P.C.

(57) ABSTRACT

A method and distributed system for exclusively sharing data between a data provider and one or more selected data recipients is disclosed. Known systems for exclusively sharing data with one or more selected data recipients involve the encryption of the data at a central storage service and limiting use of one or more centrally stored decryption keys to decrypt the data in accordance with an access control list maintained by the remote storage service provider. Ensuring robustness of key management in such systems requires the expenditure of a great deal of resource. This problem is addressed by a combination of two co-operating facilities in the disclosed distributed data sharing system. Firstly, a symmetric key exchange facility is provided which enables each data provider to exclusively derive 182 dedicated key encryption keys with respective selected data clients. Secondly, a device controlled by the data provider is arranged to encrypt the data using a data encryption key and, for each selected data recipient, publish or share 188 a wrapped data encryption key (the data encryption key encrypted with the key encryption key dedicated to the selected recipient). Each selected data recipient is then able to unwrap the wrapped data encryption key using its dedicated key encryption key
(Continued)

Granting Data Access to decrypt the data. The method and distributed system has particular utility in the selective sharing of Internet of Things data between consumers and enterprises.

14 Claims, 11 Drawing Sheets

(58) Field of Classification Search
CPC ............. H04L 63/0478; H04L 63/0428; H04L 63/062; H04L 9/0825; H04L 63/0442; G06F 2221/2107; G06F 21/602; G06F 21/6209; G06F 2221/2141
See application file for complete search history.

(56) References Cited

U.S. PATENT DOCUMENTS

| | | | | |
|---|---|---|---|---|
| 9,830,278 | B1* | 11/2017 | Harwood | ............. H04L 63/061 |
| 9,973,481 | B1 | 5/2018 | Sharifi Mehr | |
| 10,607,027 | B1 | 3/2020 | Ben Naim et al. | |
| 2014/0169554 | A1 | 6/2014 | Scarisbrick et al. | |
| 2014/0307869 | A1* | 10/2014 | Krummel | ................ G06F 21/73 |
| | | | | 380/28 |
| 2015/0089244 | A1* | 3/2015 | Roth | .................... H04L 9/3226 |
| | | | | 713/193 |
| 2018/0198606 | A1 | 7/2018 | Le Saint et al. | |
| 2018/0343114 | A1 | 11/2018 | Ben-ari | |
| 2018/0351921 | A1 | 12/2018 | Sharifi Mehr | |
| 2019/0394035 | A1* | 12/2019 | Jaquette | ................ H04L 9/0891 |
| 2020/0084027 | A1 | 3/2020 | Duchon et al. | |
| 2021/0203489 | A1 | 7/2021 | Moran et al. | |

OTHER PUBLICATIONS

Azure Data Encryption at rest, Azure Security, Nov. 15, 2022, 7 pages.
Denning et al., A Taxonomy for Key Escrow Encryption Systems, Communications of the ACM, Mar. 1996, pp. 34-40, vol. 39, No. 3.
Encryption at rest in Google Cloud, Google Cloud Whitepaper, Jul. 2020, 18 pages.
Envelope encryption, Cloud KMS Documentation, Google Cloud, Updated Dec. 4, 2023, 5 pages.
International Search Report and Written Opinion of the ISA for PCT/EP2022/066496 mailed Sep. 30, 2022, 18 pages.
Great Britain Search Report for GB2109926.2 dated Jun. 30, 2023, 6 pages.
Combined Search Report and Examination Report for GB2109926.2 dated Mar. 7, 2022, 14 pages.
International Preliminary Report on Patentability and Written Opinion of the International Searching Authority mailed Jan. 18, 2024, issued for International Application No. PCT/EP2022/066496 (12 pages).

* cited by examiner

Figure 1

Figure 2 – Identity Server

Figure 3 – Edge Gateway

Figure 4 – Data Access Controller

Figure 5 – Client Device

| Access Control List Issuance Transaction (T_0) | |
|---|---|
| Input State | |
| NULL | |
| Output State | |
| URI | http://storage.thirdparty.com/storage/v1/EncryptedDataItem1 |
| Data Provider | C=UK, ST=London, L=London, O=Customer1, CN=customer1@btinternet.com |
| Required Signatories | |
| Required Signatory | C=UK, ST=London, L=London, O=Customer1, CN=customer1@btinternet.com |

Figure 6A

| Access Control List Update Transaction (T_1) | | | |
|---|---|---|---|
| Input State | | | |
| Transaction ID | Hash (T_0) | Transaction Index | 1 |
| Output State | | | |
| URI | http://storage.thirdparty.com/storage/v1/EncryptedDataItem1 | | |
| Data Provider | C=UK, ST=London, L=London, O=Customer1, CN=customer1@btinternet.com | | |
| Authorised Recipient | C=UK, ST=London, L=London, O=Enterprise1, CN=enterprise1@btinternet.com | | |
| KSO | AES-256 (KEK for Customer1/Enterprise1 Pair, Customer1's DEK) | | |
| Required Signatories | | | |
| Required Signatory | C=UK, ST=London, L=London, O=Customer1, CN=customer1@btinternet.com | | |
| Required Signatory | C=UK, ST=London, L=London, O=Enterprise1, CN=enterprise1@btinternet.com | | |

Figure 6B

| Access Control List Update Transaction (T_2) | | | |
|---|---|---|---|
| Input State | | | |
| Transaction ID | Hash (T_1) | Transaction Index | 2 |
| Output State | | | |
| URI | http://storage.thirdparty.com/storage/v1/EncryptedDataItem1 | | |
| Data Provider | C=UK, ST=London, L=London, O=Customer1, CN=customer1@btinternet.com | | |
| Required Signatories | | | |
| Required Signatory | C=UK, ST=London, L=London, O=Customer1, CN=customer1@btinternet.com | | |

Figure 6C

Figure 7 – Recording Data

Figure 8 – Granting Data Access

Figure 9 – Revoking Data Access

Figure 10 – Data Retrieval

Figure 11 – Decrypted Data Provision

SELECTIVE DATA SHARING

This application is the U.S. national phase of International Application No. PCT/EP2022/066496 filed Jun. 16, 2022, which designated the U.S. and claims priority to GB 2109926.2 filed Jul. 9, 2021, the entire contents of each of which are hereby incorporated by reference.

BACKGROUND AND SUMMARY

The present disclosure relates to a method of sharing data between a data source and one or more selected data recipients. It has particular utility in managing the sharing of Internet of Things (IoT) data between IoT devices and one or more chosen data recipients.

IoT devices, and particularly IoT devices in the home, can gather data from their surroundings which would be considered private by individuals living or working in the environment monitored by IoT device. Nevertheless, individuals and enterprises will sometimes see benefit in sharing IoT data in a controlled manner. Often, the data will be shared asynchronously, by having the data provider send the IoT data to remote storage, and allowing an enterprise access to the IoT data at a later time. Because of the sensitivity of the IoT data, there is a need to provide encryption in transit and (for cases where the data sharing is asynchronous) encryption at rest. Naturally, an enterprise offering a service to a user based on the user's IoT data needs to be able to access the user's IoT data in a decrypted form.

A problem arises in that known systems do not allow the owner of the IoT device to separately control the provision of the same IoT data to two or more selected data recipients.

According to a first aspect, there is provided a method of sharing data between a data source and one or more selected data recipients, the method comprising:
  causing encryption of data provided by the data provider using a data encryption key;
  causing storage of the encrypted data;
  for each of the selected data recipients:
    i) encrypting the data encryption key using a dedicated key encryption key dedicated to sharing data between the data provider and the selected data recipient to generate a dedicated wrapped encryption key dedicated to sharing data between the data provider and the selected data recipient; and
    ii) causing storage of a data access authorisation authorising access to the provided data by the data recipient, the data access authorisation comprising the dedicated wrapped encryption key and an identifier of the selected data recipient;
  wherein the data encryption key can later be recovered for a selected data recipient by using the same dedicated key encryption key to decrypt the dedicated wrapped encryption key found in the data access authorisation which includes an identifier of the selected data recipient.

By encrypting, or causing the encryption of, data using a data encryption key, storing, or causing the storage of the encrypted data, and, for each of the selected recipients:
  i) encrypting the data encryption key using a dedicated key encryption key dedicated to sharing data between the data provider and the selected data recipient to generate a dedicated wrapped encryption key dedicated to sharing data between the data provider and the selected data recipient; and
  ii) storing, or causing the storage of, a data access authorisation authorising access to the provided data by the data recipient, the data access authorisation comprising the dedicated wrapped encryption key and an identifier of the selected data recipient,
the provision of the data to different selected recipients is controlled by different data access authorisations, thereby offering independent control of the provision of the data to the different selected recipients. In cases where the data provider performs the steps of the method, the data provider is given direct control over which selected recipients are able to see the data provided by the data provider.

In some examples, the provided data comprises Internet of Things data. IoT data means data produced on or by IoT devices.

In some examples, a gateway router is arranged in operation to perform a method according to the first aspect. Often (but not always) IoT devices do not support the HyperText Transfer Protocol Secure (HTTPS) extension to the HyperText Transfer Protocol (HTTP). This allows the gateway router to process the IoT data (e.g. by collecting IoT from a plurality of IoT devices, encrypting it and generating access control authorisations which relate to the encrypted data).

Generating the dedicated key encryption key can comprise mathematically combining the data source's public key with the selected data recipient's private key and an identifier of the data, so that the dedicated key encryption key is dedicated to sharing the data between the data source and the selected data recipient.

According to a second aspect, there is provided a data access controller comprising:
  a receiver arranged in operation to receive a request for a requestor to access data;
  a data access request handler arranged in operation to:
    a) find that a data access control store includes a data access authorisation authorising access to the data by the requestor, the data access authorisation comprising an identifier of the requestor and a dedicated wrapped encryption key dedicated to data sharing between the data source and the requestor;
    b) unwrap the dedicated wrapped encryption key found in the data access authorisation using a dedicated key encryption key dedicated to data sharing between the data source and the requestor to cause the recovery of a data encryption key; and
    c) cause the use of the recovered data encryption key to decrypt the encrypted data.

In a system for selectively sharing data between a data source and one or more authorised data recipients, in which each selected recipient has access to, or is able to reconstruct, a dedicated key encryption key dedicated to sharing data between the data source and them, by using a data control store storing, for each of one or more selected recipients, a wrapped encryption key resulting from encrypting a data encryption key used to encrypt the data to be shared with the dedicated key encryption key dedicated to that recipient, a means of securely but openly limiting availability of the data encryption key available for use by or on behalf of the selected data recipients is provided. A data access controller according to the second aspect performs the operations necessary to control access to the data in such a system.

The data source and each of the data recipients each have a private key and an associated public key. The dedicated key encryption key dedicated to sharing data between the data source and each selected data recipient is generated by mathematically combining the data source's public key with the selected data recipient's private key. In this way, the parties involved do not have to be online at the same time in order to agree a key, which would be particularly burdensome to arrange and implement given the use of a dedicated key encryption key dedicated to sharing data between the data source and each and every selected data recipient.

BRIEF DESCRIPTION OF THE DRAWINGS

There now follows, by way of example only, a description of embodiments of the present invention. The description refers to the accompanying drawings in which.

DETAILED DESCRIPTION OF PRESENT EXAMPLE EMBODIMENTS

Figure 1:
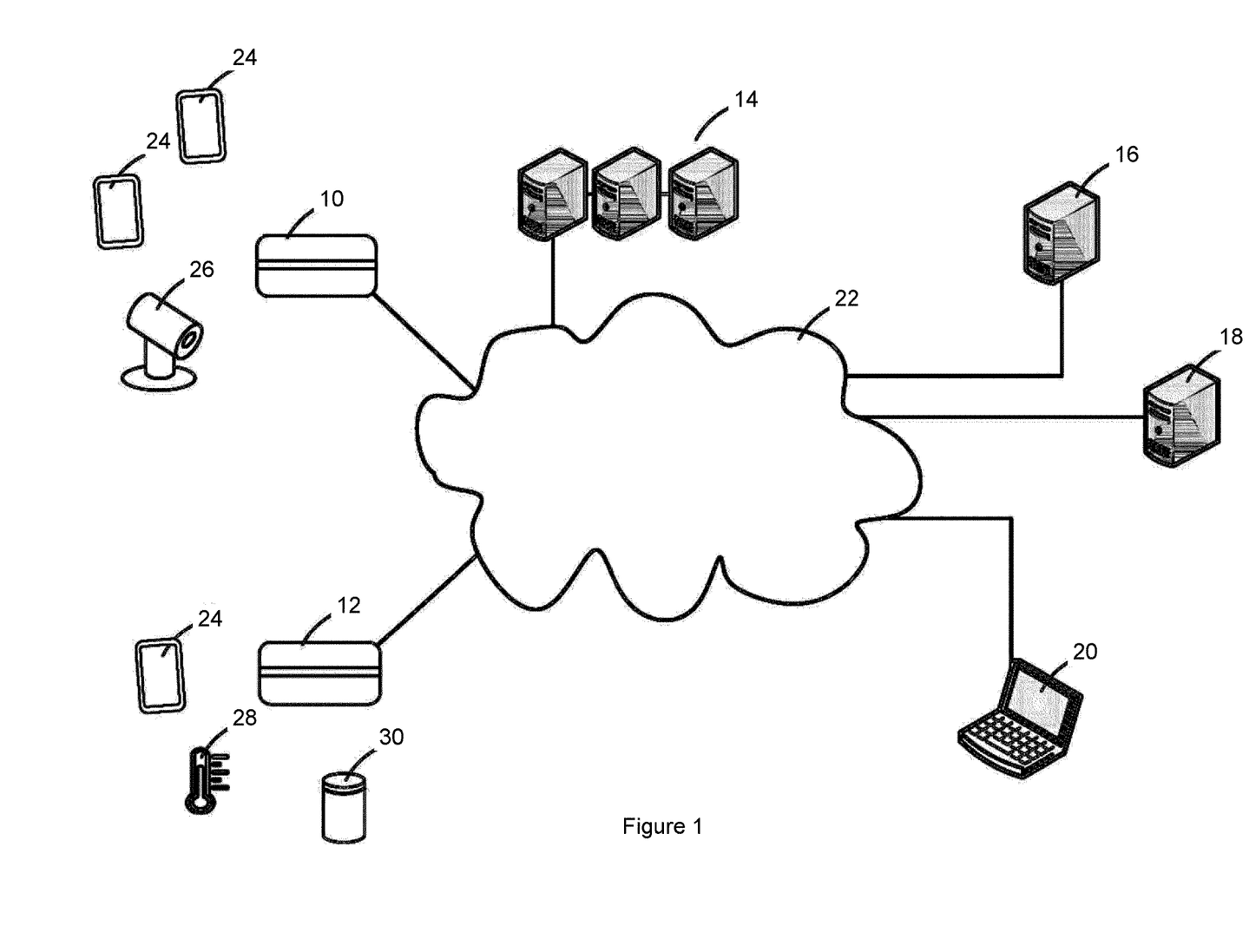
FIG. 1 illustrates a distributed IoT data sharing system.

A distributed IoT data sharing system comprises a plurality of gateway routers 10, 12, a shared data store 14, a data access controller 16, an identity server 18, and a client device 20, all interconnected via network 22.

Each gateway router 10, 12 is in communication with IoT devices which can generate IoT data, for example smartphones 24, camera 26, thermostat 28, or intelligent assistant 30. Those skilled in the art will understand that any type of IoT device might be supported by the system including sensors (e.g. environment sensors) and network logging devices for example.

The identity server (FIG. 2) used in this example to provide public/private key pairs for clients and to validate identity claims from clients comprises a central processing unit 40, a volatile memory 42, a read-only memory (ROM) 44 containing a boot loader program, and writable persistent memory—in this case in the form of a solid state disk 46. The processor 40 is able to communicate with each of these memories via a communications bus 48.

Figure 2:
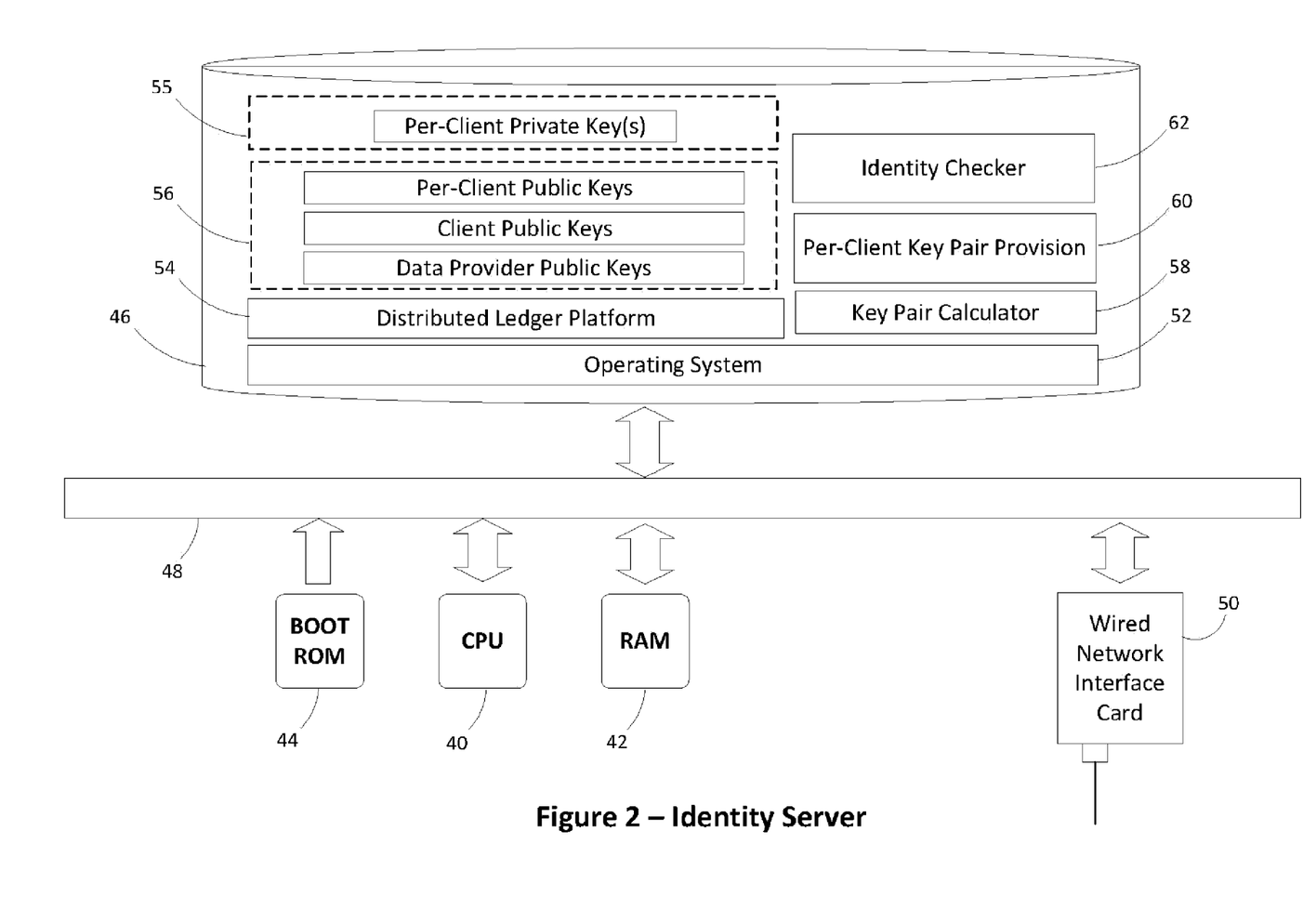
FIG. 2 illustrates the hardware and software architecture of an identity server in the distributed IoT data sharing system.

Also communicatively coupled to the central processing unit 40 via the communications bus 48 is a network interface card 50. The network interface card 50 provides a communications interface from the identity server enabling the output of client-specific public/private key pairs in response to receipt of a valid identity claim from a client.

The solid state disk 46 of the identity server 18 stores an operating system program 52, a distributed ledger application (in this specific example CORDA from R3 is used). Those skilled in the art will know that CORDA enables the sharing of data items between subsets of the members of a given CORDA network. In the present example, the members of the CORDA network include the gateway routers 10, 12, the identity server 18, the data access controller 16, and one or more client devices such as the client device 20. The distributed ledger application is configured to provide a per-client private key storage area 55 shared with the data access controller 16 and a public key storage area 56 shared with all members of the CORDA network. The public key storage area 56 contains client public keys, data provider public keys and per-client public keys. The latter pair with the per-client private keys generated by the key pair calculator 58.

Also stored on the solid state disk 46, is a public/private key pair generator 58, a client-specific key pair provision program 60 which stores per-client private keys in the private key storage area 55 and corresponding public keys in the public key storage area 56, and an identity checking program 62 executable to check identity claims received from clients via the network interface card 50. Each client-specific private key 55 is stored in the private key storage area 56 (CORDA documentation describes this as a 'vault') shared only with the data access controller.

The gateway router (FIG. 3) used in this example to encrypt IoT data, store that encrypted data in cloud storage and control access by others to the IoT data, comprises a central processing unit 70, a volatile memory 72, a read-only memory (ROM) 74 containing a boot loader program, and writable persistent memory—in this case in the form of a solid state disk 76. The processor 70 is able to communicate with each of these memories via a communications bus 78.

Figure 3:
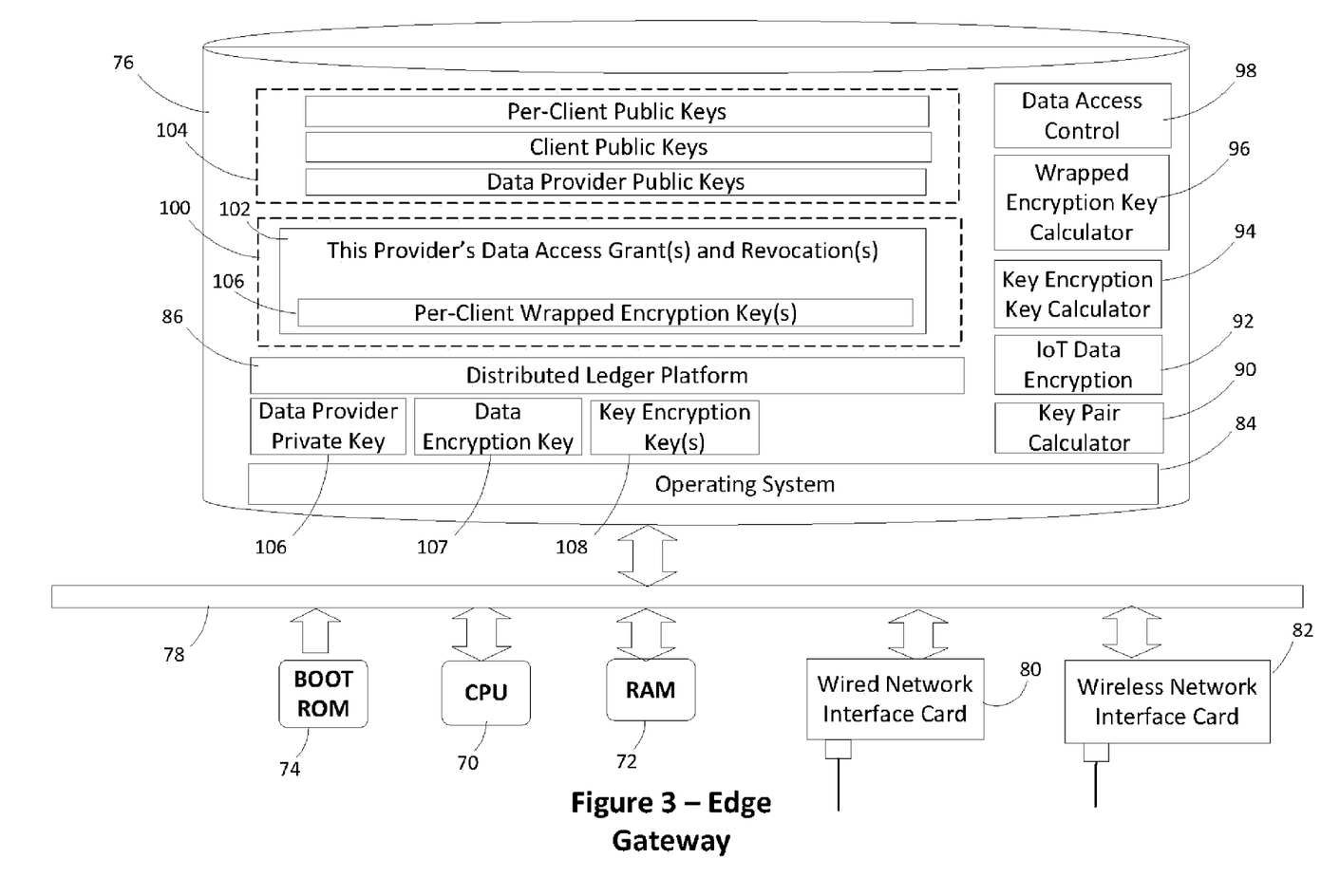
FIG. 3 illustrates the hardware and software architecture of a gateway router in the distributed IoT data sharing system.

Also communicatively coupled to the central processing unit 70 via the communications bus 78 is a wired network interface card 80 and a wireless network interface card 82. The wired network interface card 80 provides a communications interface from the gateway router to the network 22 (in this example the Internet). The wireless network interface card 82 provides a communications interface to a local area network and receives IoT data from devices (24, 26, 28, 30). In this particular example, the gateway router comprises the applicant's Smart Hub 3 augmented with software executable to provide the functionality described. It will be understood by those skilled in the art, that devices such as camera 26, thermostat 28 and intelligent assistant 30 might instead have a wired connection to the wired network interface card 80, or alternatively be provided with a wireless communication link to a dongle having a wired link to the gateway router (10, 12).

The solid-state disk 76 of the gateway router (10, 12) stores an operating system program 84, a distributed ledger application 86 (again CORDA from R3 is used). In the present example, the distributed ledger application 86 is configured to provide one or more data sharing control storage areas 100 each shared with the data access controller 16 and the selected client device to which the data sharing control storage area relates, and a public key storage area 104 shared with all members of the CORDA network (it will be understood that, provided consensus is reached by the members of the CORDA network, the contents of the public key storage area 104 on the edge gateway will mirror the contents of the public key storage area 56 on the identity server (FIG. 2)).

Also stored on the solid state disk 76, is a public/private key pair generator 90, a data encryption program 92 executable to encrypt IoT data received from one or more IoT devices (24, 26, 28, 30), a key encryption key calculator 94, a wrapped encryption key calculator 96, and an access control program 98, which is executable to cooperate with a GUI-driven client program on the user's PC or smartphone to allow the user to manage data access grants and revocations, granting or revoking access to IoT data by various clients in the distributed IoT data sharing system. The data access grants and revocations 102 are stored in the access control storage area 100 shared with the data access controller 16. Each data access grant includes an associated wrapped encryption key 106.

The solid-state disk 76 also stores the private key 106 generated by the key pair calculator 90, a data encryption key 107, a key encryption key 108 generated by the key encryption key calculator 94.

The data access controller (FIG. 4) used in this example as a proxy to handle requests from client devices for access to IoT data from a data provider (i.e. normally from the owner of the edge gateway 10,12), comprises a central processing unit 110, a volatile memory 112, a read-only memory (ROM) 114 containing a boot loader program, and writable persistent memory—in this case in the form of a solid state disk 116. The processor 110 is able to communicate with each of these memories via a communications bus 116.

Figure 4:
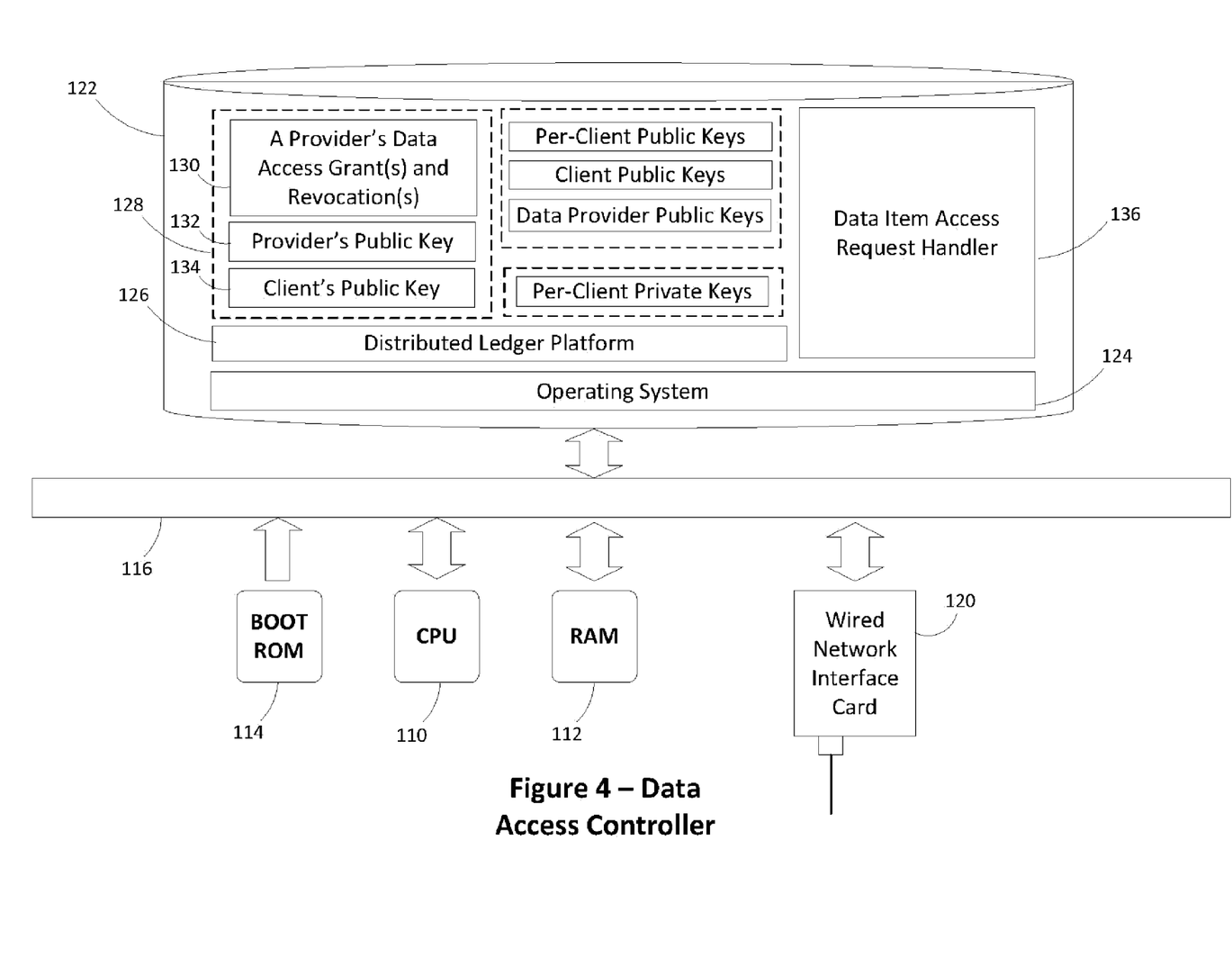
FIG. 4 illustrates the hardware and software architecture of a data access controller in the distributed IoT data sharing system.

Also communicatively coupled to the central processing unit 110 via the communications bus 116 is a wired network interface card 120. The wired network interface card 120 provides connectivity to the other elements of the IoT data sharing system via network 22.

The solid-state disk 122 of the data access controller 16 stores an operating system program 124, a distributed ledger application 126 (again CORDA from R3 is used). In the present example, the distributed ledger application 126 is configured to provide a data sharing control storage area 128 for each data sharing instance. Each data sharing control storage area 128 comprises a data provider's data access grants and revocations 130 (it will be remembered that each data access grant includes a wrapped encryption key associated with the data item sharing instance), the data provider's public key 132 and the client's public key 134 (the 'client' normally being the owner of the client device 20). Additionally, a per-client private key storage area 136 shared with the identity server 18 stores all the per-client private keys (it will be understood, assuming consensus has been reached on the distributed ledger, that the contents of the per-client private key storage area will mirror the contents of the per-client private key storage area 55 on the identity server (FIG. 2). Furthermore, the data access controller stores an instance of the public key shared storage area shared with the other members of the CORDA network.

Also stored on the solid state disk 116, is a data item request handler program 136 executable to receive a request from a client for specified IoT data provided by a data provider, look for a data sharing control storage area associated with that combination of data provider and client, and if a current access grant granting access to the specified IoT data by the client is present, perform steps to download and decrypt the specified IoT data item before providing the specified IoT data item to the client.

Figure 5:
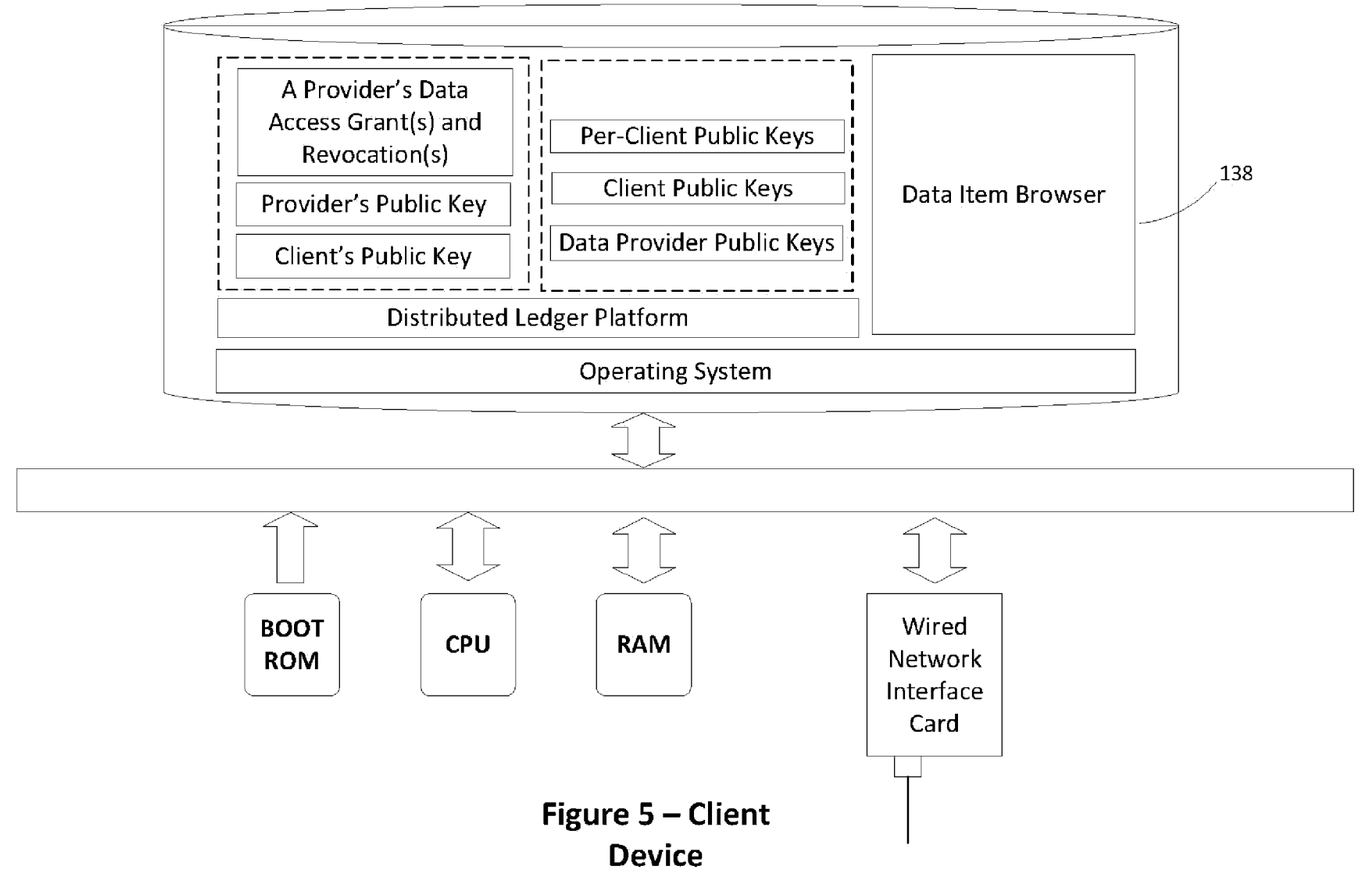
FIG. 5 illustrates the hardware and software architecture of a client device in the distributed IoT data sharing system.

FIG. 5 illustrates that each client device has a similar hardware and software architecture to the data access controller save for only having instances of data access grants and revocations which involve the client, not having access to the per-client private keys shared between the data access controller 16 and the identity server 18, and having a data item download requestor 138 instead of the data access request handler stored on the data access controller 16. The data download requestor 138 has access to the data access grants stored in the data sharing control storage areas shared with respective gateway routers 10, 12 and the data access controller 16.

Figure 6A:
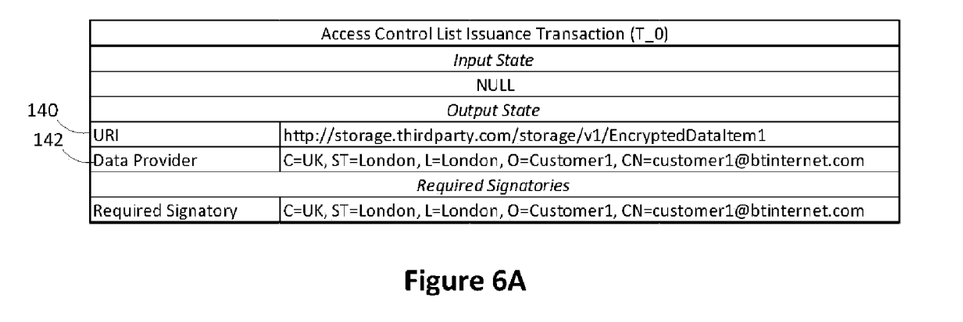
FIGS. 6A to 6C illustrate transactions recorded in the distributed ledger in which a data item provider grants or revokes data access authorisation for a client.

FIG. 6A illustrates a transaction entry which is written by the gateway router (10, 12) to a data sharing control storage area it shares with the data access controller 16 and a selected client device. As will be understood by those skilled in the art, CORDA provides a ledger by storing transactions which change an input state to an output state. Once the transaction has occurred, the input state is marked as historic and the output state becomes the current state.

Each transaction has an input state and an output state. In the case of CORDA, a transaction is proposed, and then completed when digitally signed by all the required signatories of the transaction.

In this example, the gateway router (10, 12) proposes and completes an access control issuance transaction (FIG. 6A) in order to record the existence of an IoT data item in the IoT data item sharing system.

In the access control issuance transaction, the input state is null and the output state comprises:
 i) a reference 140, in this particular example, a Uniform Resource Identifier, to an encrypted data item stored in cloud-based storage 14;
 ii) the public key 142 of the data provider.

Figure 6B:
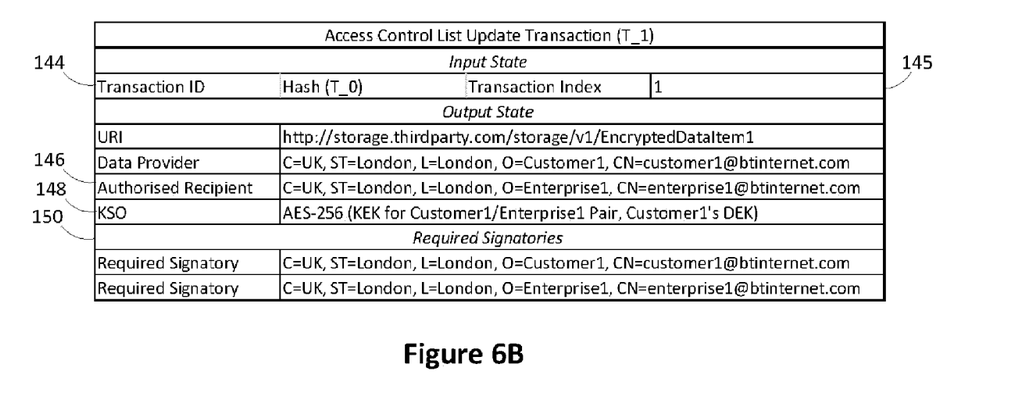

The data provider may then subsequently propose an access control list update transaction (FIG. 6B).

In this example transaction granting access to a particular IoT data item to a particular client, the input state comprises a unique transaction ID 144 obtained by hashing the issuance transaction (FIG. 6A) which led to the current state, and a transaction index 145. The transaction index 145 indicates the number of transactions in the chain which provides an indication of the length or size of the chain without requiring the chain to be parsed. Including a hash of the transaction which led to the current state provides an immutable record of changes to the access control list made by the data provider.

The output state of the transaction comprises:
 i) the reference 140;
 ii) the public key 142 of the data provider;
 iii) the public key 146 of the client granted access to the encrypted data item referenced by the URI 140;
 iv) a wrapped encryption key 148 associated with this combination of data provider and client;
 v) a list 150 of required signatories to the transaction.

As will be understood by those familiar with the operation of the CORDA ledger, the transaction will only complete when the required signatories to the transaction (in this case the data provider and the client) have digitally signed the transaction.

Figure 6C:
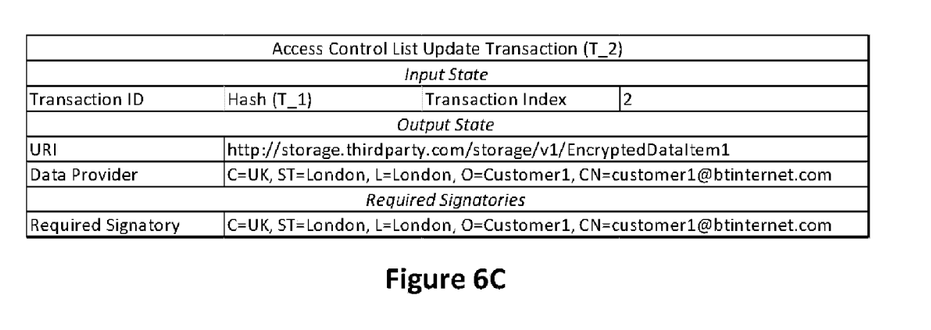

FIG. 6C shows a subsequent transaction in which the data provider revokes the client's access to the IoT data item. Once again, the transaction includes an input state and an output state, with the input state being a hash of the transaction (FIG. 6B) granting access, and a transaction index, and the output state of the transaction comprising:
 i) the reference 140;
 ii) the public key 144 of the data provider; and
 iii) an indication that the data provider is the only required signatory to the transaction.

When the data provider signs the transaction in FIG. 6C, the transaction in FIG. 6B will be marked as historic, and the output state of the transaction will be the current state. It will be seen that each data sharing control storage area (100, 128), shared by the data access controller 16 with a data provider (10, 12) and the relevant client, will store a current state of access control transactions for each URI for which the data provider has provided a given client access.

Figure 7:
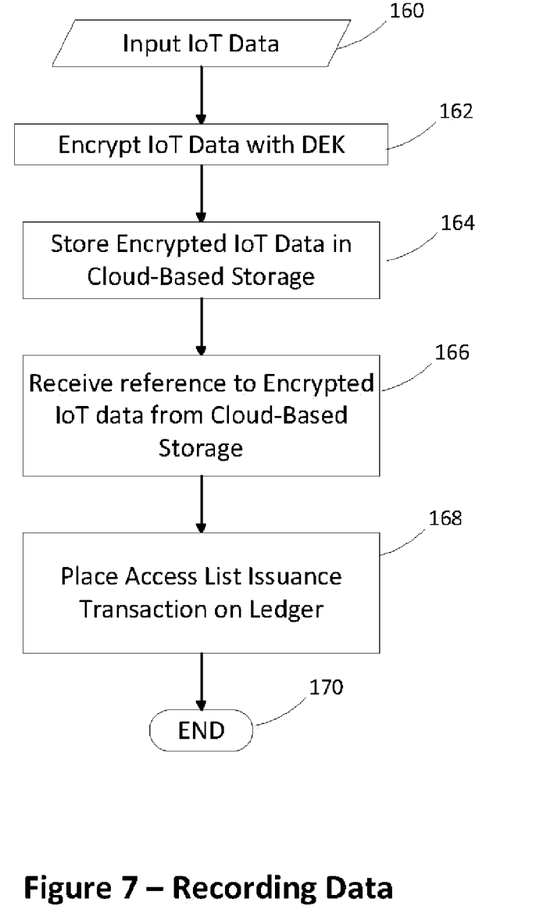
FIG. 7 illustrates a data recording process performed by each gateway router.

FIG. 7 illustrates a process followed by each gateway router (10, 12) on receiving IoT data from an IoT device (24, 26, 28, 30). The process begins with the gateway router (10, 12) receiving 160 unencrypted IoT data from an IoT device (24, 26, 28, 30). The gateway router (10, 12) then encrypts 162 the IoT data using the data encryption key 107 stored in its persistent memory, and uploads 164 the encrypted IoT data to the cloud-based storage 14. The cloud-based storage responds to the upload by returning a reference to the encrypted IoT data 166 to the gateway router (10, 12). The gateway router (10, 12) then places one or more access control issuance transactions (FIG. 6A) onto the data sharing control storage areas it shares with the data access controller 16 and client devices.

Figure 8:
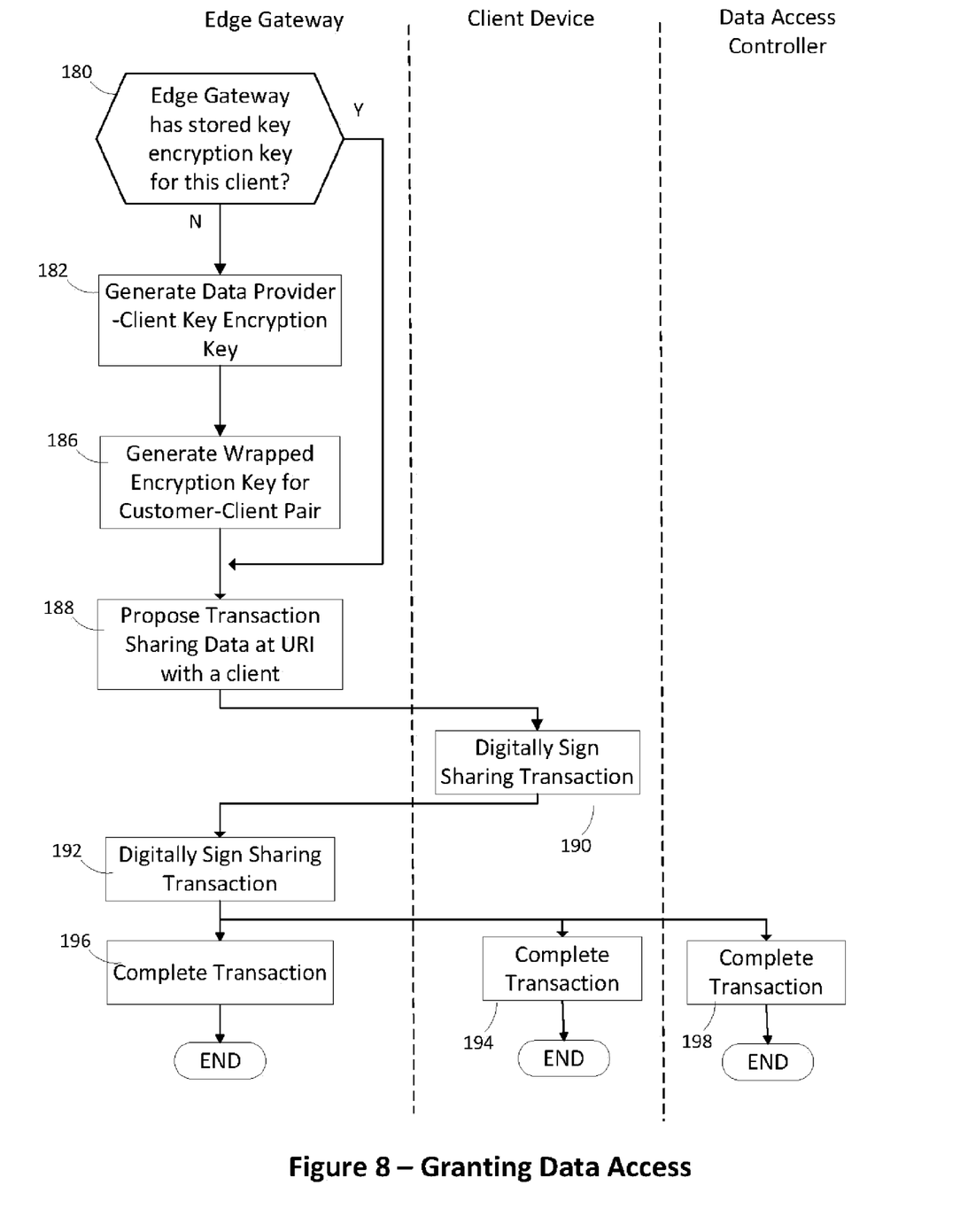
FIG. 8 illustrates how a gateway router grants data access to a client.

FIG. 8 illustrates a process followed by the gateway router (10, 12) and a selected client device 20 in order for the gateway router (10, 12) to grant access to an IoT data item to the selected client device 20.

The gateway router (10, 12) begins by testing 180 whether it has previously generated a key encryption key 108 for this client. If no key encryption key 108 for this client is found, the gateway router executes the key encryption key calculation program 94 to generate 182 a key encryption key. The key encryption key is calculated by combining the data provider's private key 106 with the per-client public key found for the client in the shared public key data area 104 in a manner based on Diffie-Hellman key exchange. In particular, the gateway router generates the dedicated key encryption key for this client as:

$$KEK = \text{Hash}(\text{Edge Gateway } ID | \text{Client } ID | g^{y1x} \bmod n) \quad \text{Equation 1}$$

where Gateway router ID and Client ID are the identities of the gateway router and this client, and $g^{y1x} \bmod n$ is computed by the gateway router using its private key x and the client's public key $g^{y1} \bmod n$.

Thereafter, the gateway router executes the wrapped encryption key calculator program 94 to calculate a wrapped encryption key 109 for the client by encrypting the data encryption key 107 with the key encryption key 108.

Once a wrapped encryption key has been found or calculated, the gateway router proposes 188 an access granting transaction (FIG. 6B) to the client device 20. The client device 20 verifies the proposed transaction, and, if it accepts the transaction, it digitally signs 190 the transaction.

Once the client device 20 has digitally signed 190 the transaction, the gateway router digitally signs 192 the transaction, and the gateway router, the client device and the data access controller then mark the transaction as complete in the data sharing control storage area they share with one another.

Figure 9:
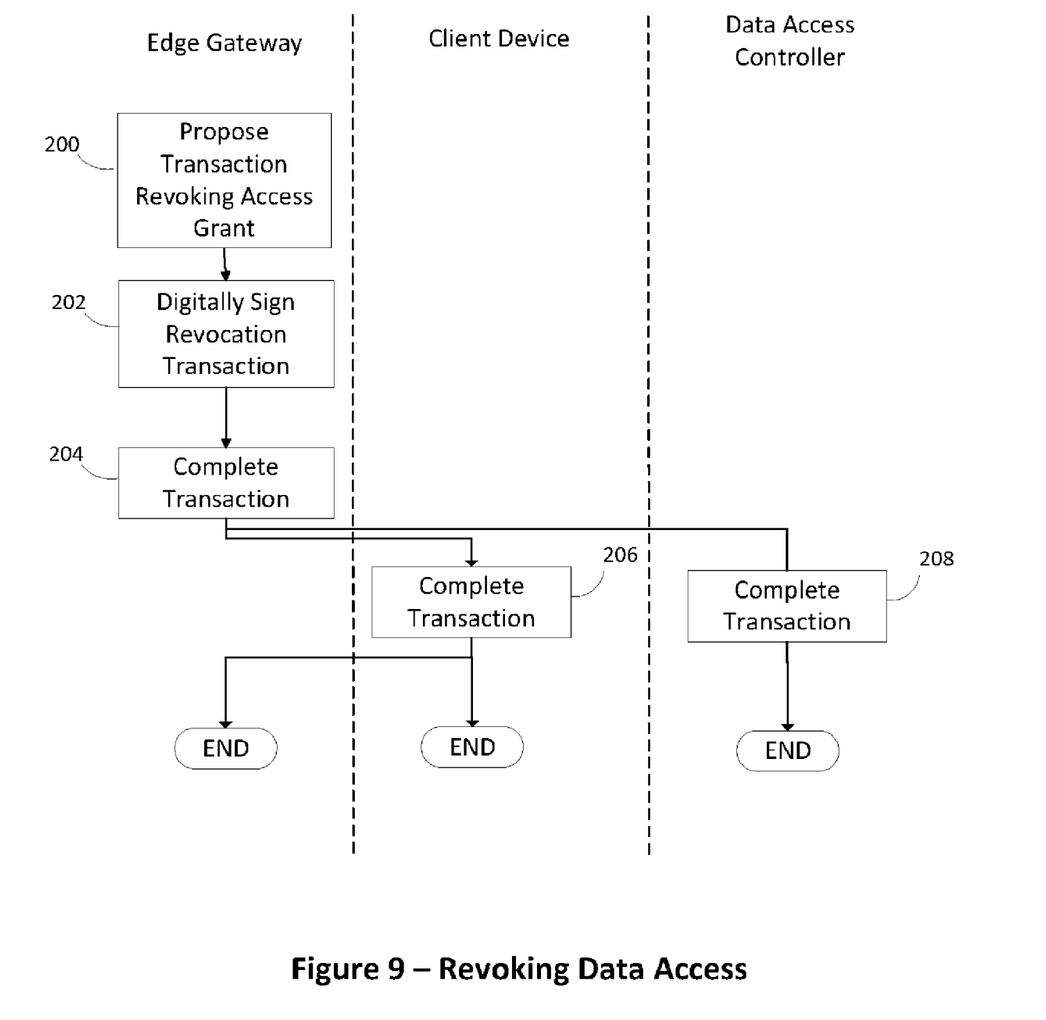
FIG. 9 illustrates how a gateway router revokes a client's data access.

FIG. 9 illustrates a process followed by the gateway router (10, 12) and the client device 20 when the gateway router (10, 12) revokes access to an IoT data item to the client device 20.

The gateway router (10, 12) begins by proposing 200 a revocation transaction (FIG. 6C) for which the only required signatory is the gateway router (10, 12). The gateway router then digitally signs 202 the transaction and the gateway router, the client device and the data access controller then mark the transaction as complete in the data sharing control storage area they share with one another.

Figure 10:
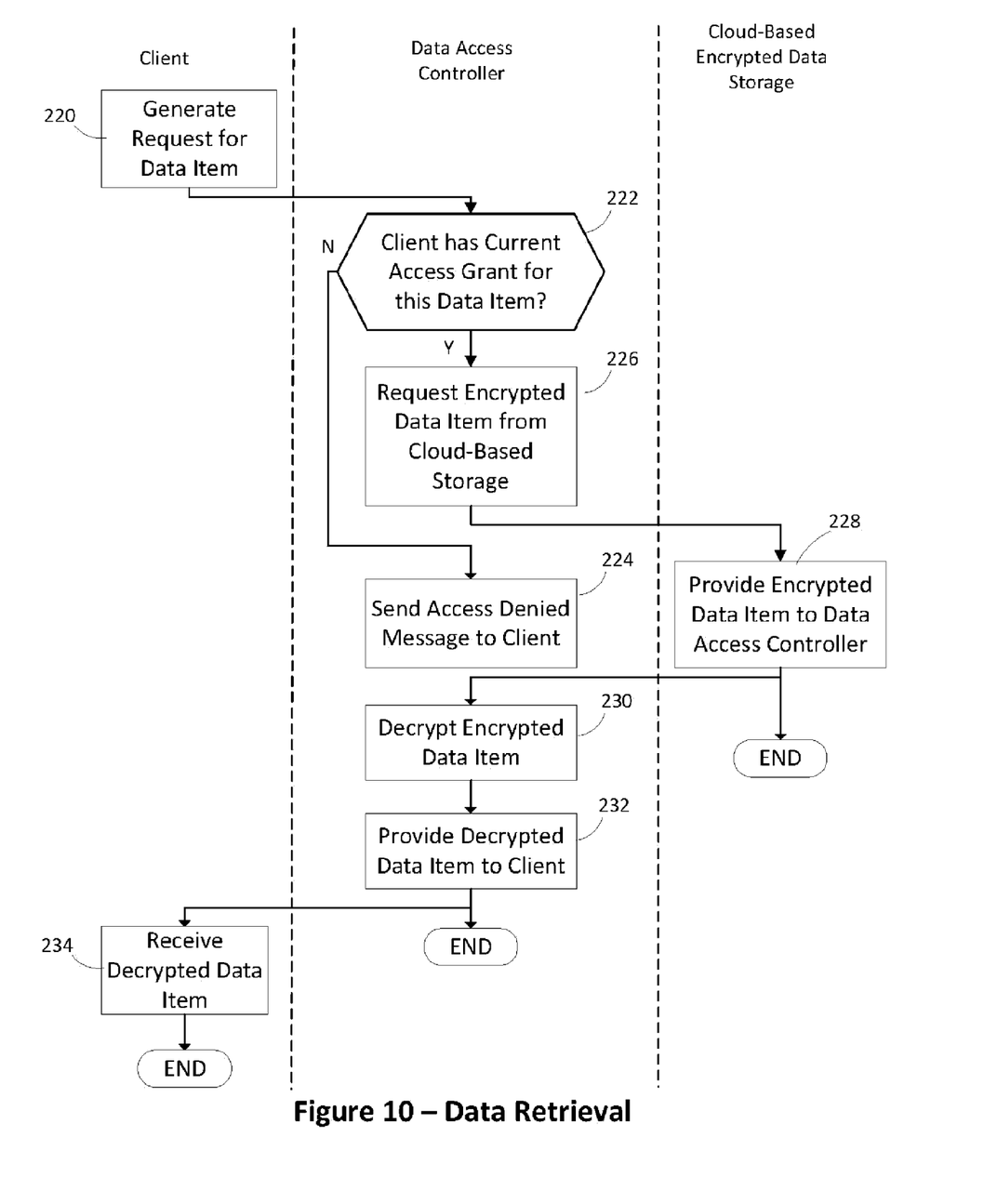
FIG. 10 illustrates a data retrieval process performed by the client device, data access controller and shared encrypted data storage.

FIG. 10 illustrates how the client device 20, data access controller 16, and cloud-based encrypted data storage 14 co-operate to enable an authorised client device to retrieve IoT data stored in encrypted from in the cloud-based storage 14.

The process starts when the client device 20 generates 220 a request for an IoT data item and sends it to the data access controller 16. The request includes an identity certificate for the client, a URI referencing the requested data, and an identifier of the data provider or gateway router (10, 12) which provided the data, and is digitally signed by the client. The data access controller 16 receives the request, verifies the digital signature, and if the digital signature is verified, queries the data sharing control storage area shared with the client and the data provider to find 222 whether the client has a current access grant for the requested IoT data item.

If there is no such current access grant then the data access controller 16 sends 224 an access denied message to the client device 20.

If there is a current access grant then the data access controller 16 sends a request for the encrypted IoT data item to the cloud-based encrypted data storage 14. The cloud-based encrypted data storage provides 228 the requested IoT data item (in encrypted form) to the data access controller 16.

The data access controller 16 then decrypts 230 the encrypted IoT data item (using a process which will described below with reference to FIG. 11) and provides the decrypted IoT data item to the client device 20. The client device receives 234 the decrypted IoT data item requested at the start of the process.

Figure 11:
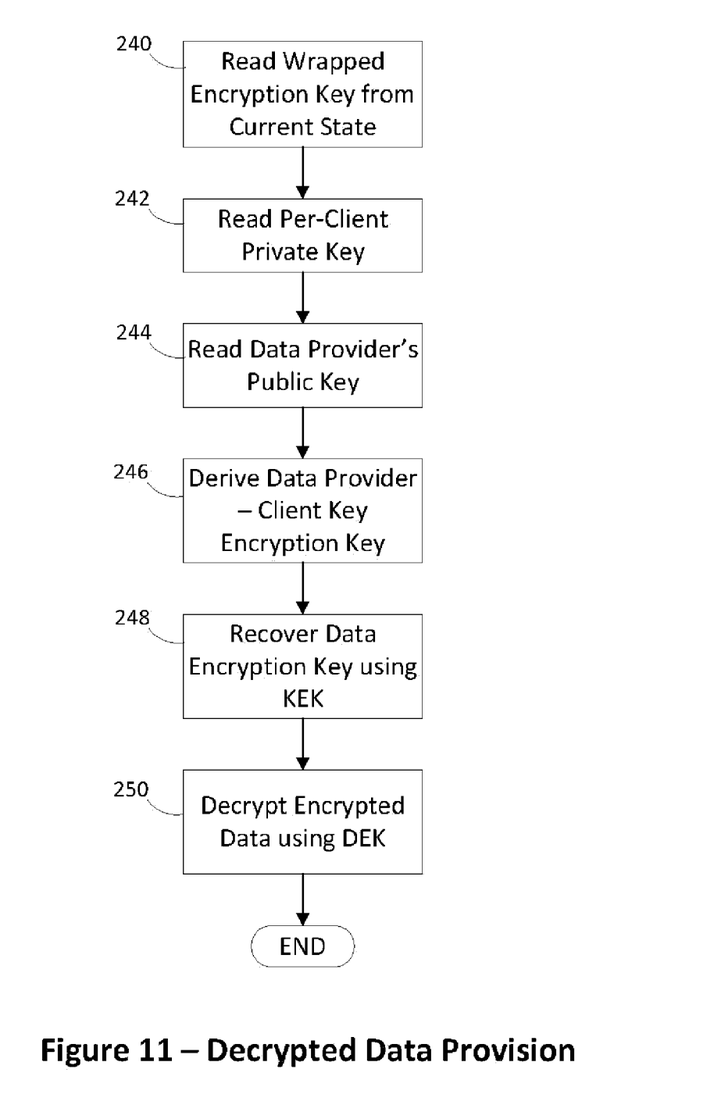
FIG. 11 illustrates how the data access controller provides a decrypted data item to a client.

FIG. 11 shows the process executed by the data access controller 16 to decrypt the encrypted data item from the cloud-based encrypted data store 14. The decryption process begins with reading 240 the wrapped encryption key from the relevant access grant stored in the data sharing control storage area. The per-client private key is then read 242 from the private key data storage area shared between the data access controller 16 and the identity server 18. The data provider's public key is then read 244, and the data provider's public key is mathematically combined with the per-client private key to derive 246 the same key encryption key used by the gateway router (10, 12) to produce the wrapped encryption key.

In particular, the data access controller generates the dedicated key encryption key for this client as:

$$KEK = \text{Hash}(\text{Edge Gateway } ID | \text{Client } ID | g^{xy1} \bmod n) \quad \text{Equation 2}$$

where Gateway router ID and Client ID are the identities of the gateway router and this client, and $g^{y1x} \bmod n$ is computed by the data access controller using the public key of the data provider $g^x \bmod n$ and the temporary private key $y_1$ of the client.

Those skilled in the art will understand that this ability for the two parties (gateway router, data access controller) to derive a secret shared key by agreeing on values for g and n, and taking each other's public key ($g^x \bmod n$, $g^y \bmod n$) and combining it with a private key (x, y) which is not shared with the other, forms the basis of Diffie-Hellman public key cryptography. Other forms of public key cryptography can be used to arrive at a shared secret key in a manner which makes it computationally practically infeasible for others to arrive at the shared secret key.

Next, the generated key encryption key is used to recover 248 the data encryption key from the wrapped encryption key. The data access controller 16 then decrypts the encrypted IoT data item received from the cloud-based encrypted data store using the recovered data encryption key.

It will be seen how the example provides a distributed IoT data sharing system which enables a data provider to select which clients are able to access IoT data uploaded by the data provider to remote storage in encrypted form. Furthermore, by arranging the gateway router to use key encryption keys dedicated to particular clients to generate dedicated wrapped data encryption keys (i.e. the data encryption key encrypted using the dedicated key encryption key), and to post on a distributed ledger, for each client for which the data provider approves access to the IoT data, a data access grant including the dedicated wrapped encryption key, a method and system is provided which enables sharing of IoT data which allows the data provider to independently control which clients have access to the IoT data.

Possible variations to the above example include:

i) in the above example, encryption of the data using the data encryption key was performed by the gateway router (10, 12). In alternative examples, encryption with the data encryption key could instead be performed by the remote storage service 14. In such examples, the data could be uploaded by the gateway router (10, 12) to the remote storage service 14 using encryption in transit techniques such as Transport Layer Security.

ii) in the above example, decryption of the data using the data encryption key was performed by the data access controller 16. In alternative examples, decryption of the data using the data encryption key could instead be performed by the remote storage service 14. The data could then be downloaded from remote storage 14 by the client device 20 using encryption in transit techniques such as Transport Layer Security.

iii) instead of Diffie-Hellman key exchange, other public key cryptography key exchange algorithms could be used. In particular, instead of using a symmetric key algorithm such as the Advanced Encryption Standard to encrypt the data encryption key and store it as a Key Security Object 148 in the data access authorisation, a public key cryptography algorithm (e.g. RSA, ElGamal, elliptic curve cryptography) could be used to encrypt the data encryption key with the client's public key and store that the encrypted data encryption key in the data access authorisation in place of the Key Security Object 148 seen in the above example. As a further alternative, the dedicated key encryption keys could be symmetric key encryption keys provided for each gateway router, client device pair using other symmetric key exchange techniques.

iv) in the above example, each data sharing instance exclusively involved one data provider (normally the owner of the gateway router (10, 12)) and one authorised data recipient (normally the owner of the client device 20). In other examples, public key cryptography based multiple-party key distribution algorithms might be used to agree a key encryption key shared exclusively by one data provider and a plurality of selected authorised data recipients. Each of the selected authorised data recipients could be identified in the corresponding data access authorisation, and all might be required to digitally sign the authorisation.

v) in the above example, the data access control store used to store each data provider's access grants and revocations comprised the CORDA distributed ledger platform. In other examples, the data access control store comprises another distributed ledger platform which provides immutable access grants and subsequent revocations by virtue of including a digital signature of a previous block or state in the subsequent block or state in the chain (examples include Ethereum and the like). In other examples the data access control store might comprise another form of distributed database, or even a centralised database accessible by the gateway routers (10,12), client devices 20 and data access controller 16.

vi) in the above example, the dedicated key encryption key was the result of applying a one-way hash function to a concatenation of an edge gateway ID, a client ID and a number computable by each of the gateway router (10, 12) and the data access controller 16 using their private key and the public key of the other. In other examples, the concatenation might further include the Universal Resource Indicator identifying the IoT data. In such examples, a different dedicated key encryption key would be provided for each data provider, authorised data recipient, URI triple—i.e. different dedicated key encryption keys would be provided for different data items provided via the gateway router (10, 12). In other examples, one or both of the edge gateway ID and the client ID might not be included in the concatenation.

vii) in the above example, the data encryption key was recovered for a selected data recipient by arranging the data access controller 16 to generate the shared key encryption key using knowledge of the private key of the selected data recipient (in the above example, the client device) requesting the data. In alternative examples, the private key might instead be generated by or provided directly to the client device 20, and the client device might then extract the data encryption key from the wrapped data encryption key, download the encrypted data from the shared storage and decrypt the data. However, the arrangement set out in the above example is preferred because giving the selected data recipient access to the data encryption key might unintentionally give the client access to other data encrypted with the same data encryption key by the gateway router (10, 12).

viii) in the above example, the reference included in the data access authorisation took the form of a Universal Resource Identifier. In other examples, other forms of reference might be used to identify the encrypted data.

ix) in the above example, the IoT data provided by the IoT devices was encrypted by a gateway router (10,12) interconnecting a local area network to a wide area network. In other examples, the IoT data source (24, 26, 28, 30) itself might encrypt the data and write corresponding data access authorisations to a data access control store.

x) in the above example, the public and private keys were stored in a data access control store. In other examples, the public and private keys might be generated and stored by the CORDA Identity Manager Service (or, more generally, an identity management service).

xi) in the above example, the data access control store comprised a data sharing control storage area shared exclusively between the gateway router (10, 12) of the data provider, the data access controller and a selected client device. This has the benefit that clients are unable to access information about which other clients have been granted access to data. However, in other examples, the data sharing control storage area could be shared by and accessible to all members of the CORDA network.

In summary of the above disclosure, a method and distributed system for exclusively sharing data between a data provider and one or more selected data recipients is disclosed. Known systems for exclusively sharing data with one or more selected data recipients involve the encryption of the data at a central storage service and limiting use of one or more centrally stored decryption keys to decrypt the data in accordance with an access control list maintained by the remote storage service provider. Ensuring robustness of key management in such systems requires the expenditure of a great deal of resource. This problem is addressed by a combination of two co-operating facilities in the disclosed distributed data sharing system. Firstly, a symmetric key exchange facility is provided which enables each data provider to exclusively derive 182 dedicated key encryption keys with respective selected data clients. Secondly, a device controlled by the data provider is arranged to encrypt the data using a data encryption key and, for each selected data recipient, publish or share 188 a wrapped data encryption key (the data encryption key encrypted with the key encryption key dedicated to the selected recipient). Each selected data recipient is then able to unwrap the wrapped data encryption key using its dedicated key encryption key to decrypt the data. The method and distributed system has particular utility in the selective sharing of Internet of Things data between consumers and enterprises.

The invention claimed is:

1. A method of sharing data between a data source and one or more selected data recipients, the method, performed by a gateway router having a public key and a private key, comprising:
   encrypting data provided by the data source using a data encryption key;
   storing the encrypted data;
   for each of the selected data recipients:
   i) generating a dedicated key encryption key dedicated to sharing data between the data source and the selected data recipient;
   ii) encrypting the data encryption key using the dedicated key encryption key to generate a dedicated wrapped encryption key dedicated to sharing data between the data source and the selected data recipient; and
   iii) storing a data access authorisation authorising access to the provided data by the selected data recipient, the data access authorisation comprising the dedicated wrapped encryption key and an identifier of the selected data recipient;
   wherein the data encryption key is later recovered for a selected data recipient by a data access controller having associated public and private keys and being operable to control access to decrypted data by requestors, using the same dedicated key encryption key to decrypt the dedicated wrapped encryption key found in the data access authorisation; and
   the dedicated key encryption key is generated by applying a one-way hash function to a concatenation of an edge gateway ID of the gateway router, a client ID of the selected data recipient and a number computable by each of the gateway router and the data access controller using their private key and the public key of the other.

2. The method according to claim 1 in which step i) comprises using Diffie-Hellman public key cryptography.

3. The method according to claim 1 in which each data access authorisation further comprises a reference to the stored encrypted data.

4. The method according to claim 1 wherein storing a data access authorisation comprises storing a data access authorisation in a data access control store.

5. The method according to claim 4 in which the data access control store comprises a distributed ledger.

6. The method according to claim 1 wherein the provided data comprises Internet of Things data.

7. The method according to claim 1, the method further comprising operating a data source to digitally sign the data access authorisation, and further include the digital signature in the data access authorisation.

8. A gateway router having a public key and a private key, the gateway router being arranged in operation to perform a method of sharing data between a data source and one or more selected data recipients, wherein the gateway router comprises:
   a memory storing instructions such that when executed by a hardware processor, the gateway router is at least configured to:
   encrypt data provided by the data source using a data encryption key;
   store the encrypted data;
   for each of the selected data recipients:
   i) generate a dedicated key encryption key dedicated to sharing data between the data source and the selected data recipient;
   ii) encrypt the data encryption key using the dedicated key encryption key to generate a dedicated wrapped encryption key dedicated to sharing data between the data source and the selected data recipient; and
   iii) store a data access authorisation authorising access to the provided data by the selected data recipient, the data access authorisation comprising the dedicated wrapped encryption key and an identifier of the selected data recipient;
   wherein the data encryption key is later recovered for a selected data recipient by a data access controller having associated public and private keys and being operable to control access to decrypted data by requestors, using the same dedicated key encryption key to decrypt the dedicated wrapped encryption key found in the data access authorisation; and
   the dedicated key encryption key is generated by application of a one-way hash function to a concatenation of an edge gateway ID of the gateway router, a client ID of the selected data recipient and a number computable by each of the gateway router and the data access controller using their private key and the public key of the other.

9. A data access controller having associated public and private keys and comprising:
   a receiver configured to receive a request for a requestor to access encrypted data; and
   a memory storing instructions such that when executed by a hardware processor, the data access controller is at least configured to:
   a) find determine that a data access control store includes a data access authorisation authorising access to the encrypted data by the requestor, the data access authorisation comprising an identifier of the requestor and a dedicated wrapped encryption key dedicated to data sharing between a source of the encrypted data and the requestor;

b) generate a dedicated key encryption key dedicated to sharing data between the data source and the requestor by applying a one-way hash function to a concatenation of an edge gateway ID of a gateway router having associated public and private keys, a client ID of the requestor and a number computable by each of the gateway router and the data access controller using their private key and the public key of the other;

c) unwrap the dedicated wrapped encryption key found in the data access authorisation using the generated dedicated key encryption key to recover a data encryption key; and d) use the recovered data encryption key to decrypt the encrypted data.

10. The data access controller according to claim 9 in which the data access controller is further configured to:

e) pass the decrypted data to the requestor.

11. The data access controller according to claim 9 wherein each data access authorisation further comprises an identifier of the data source and a digital signature, the data access controller further being configured to verify that the digital signature is that of the identified the data source, and only provide the decrypted data to the requestor if the digital signature is verified.

12. The data access controller according to claim 9 wherein the receiver is further configured to receive one or more data access control store update requests from one or more data sources.

13. A data sharing system comprising:
the gateway router according to claim 10;
a data access controller; and
a data access control store.

14. A non-transitory computer-readable storage medium comprising instructions to cause a hardware processor to perform the method of claim 1.

* * * * *